(12) United States Patent
Eichler

(10) Patent No.: US 8,763,420 B2
(45) Date of Patent: Jul. 1, 2014

(54) FREEZER SEGMENT FOR A FREEZER FOR CONFECTIONARY WITH SEGMENTS INCLUDING CHANNELS FOR DIRECT EVAPORATION OF $CO_2$

(75) Inventor: Klaus Eichler, Aabenraa (DK)

(73) Assignee: Gram Equipment A/S, Vojens (DK)

( * ) Notice: Subject to any disclaimer, the term of this patent is extended or adjusted under 35 U.S.C. 154(b) by 850 days.

(21) Appl. No.: 12/308,921

(22) PCT Filed: Jul. 6, 2007

(86) PCT No.: PCT/DK2007/000347
§ 371 (c)(1),
(2), (4) Date: Dec. 29, 2008

(87) PCT Pub. No.: WO2008/003325
PCT Pub. Date: Jan. 10, 2008

(65) Prior Publication Data
US 2009/0277208 A1 Nov. 12, 2009

(30) Foreign Application Priority Data
Jul. 7, 2006 (DK) .................................. 2006 00934

(51) Int. Cl.
*F25C 1/04* (2006.01)

(52) U.S. Cl.
USPC .......... 62/356; 62/66; 62/300; 62/71; 62/385; 62/1

(58) Field of Classification Search
USPC .................... 62/356, 300, 1, 350, 66, 71, 385
See application file for complete search history.

(56) References Cited

U.S. PATENT DOCUMENTS

| | | | | |
|---|---|---|---|---|
| 2,090,590 A | * | 8/1937 | Clarke | 62/56 |
| 2,495,421 A | * | 1/1950 | Pownall | 62/356 |
| 2,775,099 A | | 12/1956 | Brown | |
| 2,791,890 A | * | 5/1957 | Hoyer | 62/345 |
| 3,024,622 A | * | 3/1962 | Gram | 62/340 |
| 3,091,194 A | * | 5/1963 | Dickinson | 426/249 |
| 4,546,615 A | * | 10/1985 | Gram | 62/73 |
| 4,942,742 A | * | 7/1990 | Burruel | 62/347 |
| 5,029,453 A | * | 7/1991 | Scherer | 62/320 |
| 5,265,439 A | * | 11/1993 | Hobelsberger | 62/356 |
| 6,156,366 A | * | 12/2000 | Waldstrøm et al. | 426/515 |

(Continued)

FOREIGN PATENT DOCUMENTS

| | | |
|---|---|---|
| EP | 0 417 413 | 3/1991 |
| EP | 1 728 436 | 12/2006 |

(Continued)

*Primary Examiner* — Cheryl J Tyler
*Assistant Examiner* — Melanie Phero
(74) *Attorney, Agent, or Firm* — James Creighton Wray

(57) ABSTRACT

The present invention concerns a freezer segment for a freezer of the type used for casting confectionery in molds which are cooled for freezing and subsequently supplied with heat for a short period, whereafter stripping occurs. Cooling of the molds is effected by using direct evaporation of $CO_2$. The advantage of such a freezer segment is that there is no use for both a primary and a secondary cooling circuit. Another advantage in using a system according to the invention is that working with temperatures down to about minus 50° C. is enabled, compared to about minus 40° C. with brine systems. The low freezing temperature entails that the capacity of a given system is increased by about 40%.

13 Claims, 4 Drawing Sheets

(56) References Cited

U.S. PATENT DOCUMENTS

| | | | |
|---|---|---|---|
| 6,286,331 B1 * | 9/2001 | Lee | 62/340 |
| 6,534,106 B2 * | 3/2003 | Cathenaut et al. | 426/317 |
| 7,814,754 B2 * | 10/2010 | Hermansen | 62/66 |
| 2006/0248904 A1 * | 11/2006 | Ludwig | 62/151 |

FOREIGN PATENT DOCUMENTS

| | | |
|---|---|---|
| GB | 177144 | 3/1923 |
| GB | 699404 | 11/1953 |
| WO | WO 03/099034 | 12/2003 |

* cited by examiner

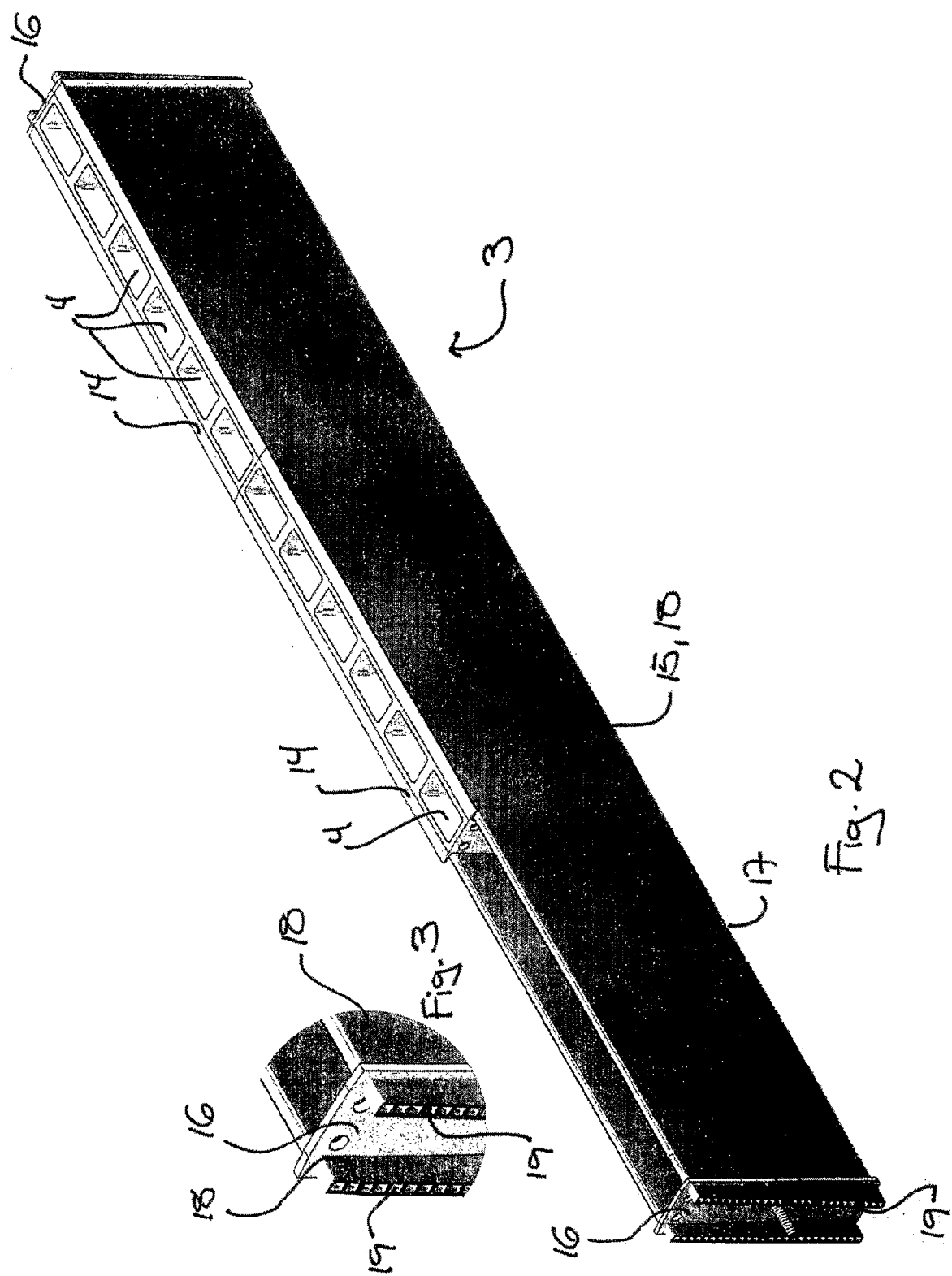

FREEZER SEGMENT FOR A FREEZER FOR CONFECTIONARY WITH SEGMENTS INCLUDING CHANNELS FOR DIRECT EVAPORATION OF $CO_2$

This application claims the benefit of Danish Application No. PA 2006 00934 filed Jul. 7, 2006 and PCT/DK2007/000347 filed Jul. 6, 2007, which are hereby incorporated by reference in their entirety.

FIELD OF THE INVENTION

The present invention concerns a freezer segment for a freezer of the type to be used in making confectionery, including edible ice of ice-cream and so-called water ice or combinations thereof, where ice is cast in moulds which are cooled for freezing after filling and applied heat after sufficient freezing, or subjected to shock cooling for a short period so that removal from the mould may be effected.

DESCRIPTION OF PRIOR ART

It is commonly known that for making confectionery, such as edible ice with a stick or other, moulds are used which are disposed in an annular freezer table or in a longitudinal freezer table. These moulds are cooled by means of a secondary coolant, typically brine, which in principle is water saturated with salt, which can be cooled to about minus 40° C. and still be fluid. This brine is cooled in a primary cooling facility, where known types of coolants may be applied. The cooled brine is thick and is subsequently pumped into the secondary part of the cooling system, where the brine is made to contact the back sides of the moulds.

The reason for using brine is that it is neither desirable nor possible to use the primary cooling directly for cooling ice, as by the prior art methods there will be too great risk of leaking from the freezing equipment. Application of brine has been used for many years, and it is a relatively simple technique which is dependable and reliable. However, it is necessary to maintain the brine, as the water content is to be kept very accurate so that the pH value is not to change so much that corrosion will occur in the system.

If a small leak occurs in the freezing system, where brine can seep out to the area where the ices are frozen, a dangerous or outright poisonous contamination of the ices will not occur, but the ices will become sour and inedible. Thus it is very important that such leaks do not occur.

From GB 699,404 it is known to use a mould cassette in connection with a freezer segment where it is cooled with a cooling system with only one cooling circuit in which Freon is used. Thus there is a risk that ice and surroundings may be contaminated by this coolant. A design like this has the said drawback, and moreover there is an inferior transmission of heat between the channels conducting the coolant, as there is only a small contact surface between channels and the wall of the mould. Finally, there is further inferior heat transmission when using a loose mould cassette, as in this situation there will be a contact surface between the freezer segment itself and the mould cassette which are to lie close to each other in order just to get reasonable heat transmission.

It is the purpose of the invention to indicate a more efficient freezer system than the prior art type with brine. At the same time, it is an object to indicate a system where replacement of moulds is readily effected without risk of contaminating moulds or confectionery, and where there is an increased thermal conductivity between mould and coolant.

DESCRIPTION OF THE INVENTION

As mentioned in the introduction, the present invention concerns a freezer segment for a freezer of the type used in making confectionery, including e.g. edible ice with stick, where the confectionery is cast in moulds which are cooled for freezing after filling and after sufficient freezing applied heat or subjected to shock cooling for a short period so that removal from the mould can take place. Cooling of the moulds is effected in a freezer segment by using direct evaporation of $CO_2$.

Generally, the invention concerns elements for use in connection with cooling and freezing of many different kinds of confectionery. In the following, the terms edible ice and ice are primarily used instead of confectionery. But in the actual text, the various terms are to be considered as confectionery in general.

Several advantages are achieved by a freezer segment according to the invention where confectionery is frozen by direct evaporation of $CO_2$. One of the most important advantages is that according to the invention there is no use for both a primary and a secondary cooling circuit. Furthermore, there is no risk that coolant becomes mixed with the confectionery, as the coolant is in a closed system. If a leak should occur anyway, possibly by rupture of a pipe or similar, then $CO_2$ is quite harmless and will just be mixed with atmospheric air.

Another advantage in using $CO_2$ in a system with direct evaporation is that it is possible to operate at temperatures down to about −50° C., compared to about −40° C. with brine systems. The low freezing temperature entails that the capacity of a given system is increased by about 40%.

In a preferred variant of a freezer segment according to the invention, the $CO_2$ brought to direct evaporation in channels in the freezer segment, preferably in plate-shaped multi-chamber profiles, where at least one plate-shaped multi-chamber profile extends along at least one row of individual moulds. By using these multi-chamber profiles where the cross-sectional area of individual channels is rather modest, e.g. 3.5×4.0 mm, it is possible to operate at relatively high pressure in the coolant without risk of rupturing the channels. (At −50° C., $CO_2$ has a pressure of about 7 bar, while $CO_2$ at 10° C. has a pressure of about 46 bar.)

The multi-chamber profiles, which e.g. may be extruded aluminium profiles in plate form of the type which i.a. is known from cooling systems for cars, may according to the invention be disposed along an array of moulds so that heat can be conducted from the moulds to the coolant.

In a further variant of a freezer segment for a freezer according to the invention, the height of the plate-shaped multi-chamber in the freezer segment may largely correspond to the depth of the moulds. Hereby is attained an efficient and uniform thermal conductivity from the moulds and to the coolant so that the confectionery/ices are frozen evenly and rapidly.

In a variant of the invention, prior to removal of moulds hot gas is conducted through the freezer segment, e.g. $CO_2$, ammonia or other suitable gases. Hereby, the outermost thin layer of ice is melted, and now it is possible to draw the confectionery/ice up from the mould by gripping an embedded stick or other embedded drawing means. The use of hot gas in connection with stripping ensures a very rapid thawing of the outermost layer of ice, thereby considerably increasing the capacity of a given freezing plant. If using $CO_2$, the hot gas may advantageously have temperatures up to about 10° C.

A preferred variant of a freezer segment for a freezer with moulds according to the invention have individual moulds which can be built together in exchangeable mould cassettes, where at least one mould cassette is connected with a freezer segment. A mould cassette may e.g. be built up with 12 individual moulds so that in this mould cassette 12 ices are cast in one row. This mould cassette may be adapted to be placed in immediate vicinity of a freezer element and may furthermore be adapted to be replaced by another mould cassette in which another type of ice or ices with other shapes are cast. With the possibility of easy replacement of mould cassettes without risk of contaminating the ices with brine, there is achieved a considerable production flexibility and thereby increased capacity. In particular the possibility of making a quick exchange without heavy lifting has a positive effect on the capacity. Replacement of mould cassettes may even be performed continuously and without interruption of the production.

A preferred variant of a mould cassette for a freezer segment for a freezer of the type mentioned is constituted by at least one individual mould, preferably of a plurality of adjoining individual moulds, which are mounted together in connection with one or more freezer segments A mould cassette may thus be made up of several elements, where each element consists of a number of adjoining individual moulds with same or different shape. In that way is achieved possibility of making different ices and confectionery at the same time depending on the need, as the mould cassettes may readily be changed and built up precisely so as to adapt the production to the actual demand.

A possible variant of a mould cassette according to the invention may be where the mould cassette at least partly is made up of plate-shaped multi-chamber profiles for direct evaporation of $CO_2$. By this variant, the most direct contact possible between confectionery and coolant is achieved as only the thin wall in the multi-chamber profile separates confectionery and coolant. In order that the mould cassettes still can be easy to replace, they are equipped with coupling means at the ends of the multi-chamber profiles so that the individual mould cassette can be coupled to the cooling system.

A further variant of a mould cassette for a freezer segment according to the invention is where a mould cassette is disposed along at least one wall, preferably between two walls made up entirely or partly of plate-shaped multi-chamber profiles, where between mould cassette and multi-chamber profile a gap appears which is filled with a heat-conducting material.

In principle, this variant may be constructed as an elongated box in which one or both of the elongated sides are made up of the plate-shaped multi-chamber profile. The box is dimensioned so that a mould cassette fits into the box, and so that there is only a minimum spacing between the exterior of the mould cassette and the interior of the box. By providing a heat-conducting material in this cavity, a good heat transmission from the confectionery in the mould cassette to the coolant in the multi-chamber profiles is achieved. The heat-conducting material may be various materials, e.g. viscous materials that are pressed out into the interspace when placing the mould cassette. A preferred material is water which is provided in the bottom of the box, and which by mounting the mould cassette is pressed out into all corners between the mould cassette and the box.

By freezing confectionery such as ice, e.g. fluid $CO_2$ is supplied to the multi-chamber profiles, and the water between these profiles and the mould cassettes is quickly frozen and the ice is frozen subsequently. When stripping with hot gas, the ice in the interspace is melted again and subsequently the outermost layer on the ice itself, after which stripping may take place. By using water to fill the narrow gap between the box and the mould cassette, there is achieved an uncomplicated, secure and non-toxic method for achieving good heat transfer.

In yet a variant of a mould cassette according to the invention, the mould cassette is made up of at least two shell parts, where the least two shell parts in the joined condition form at least one mould. A mould cassette may thus be made up of shell parts so that casting of confectionery with or without negative taper can be performed. For example, by a variant of a mould cassette it is possible to cast ice with shape as a figure in all three dimensions—so-called 3-D ice. In order to strip such 3-D ice it is of course necessary that stripping includes a step where the two shell parts are separated after they have been released from the freezer segment.

A mould cassette according to the invention may be mounted in freezer segments that are further mounted in either an annular freezer table or in a longitudinal freezer table. Hereby there is achieved the possibility that the production with such a facility may be adapted to existing production equipment which is already adapted for one or the other table type.

SHORT DESCRIPTION OF THE DRAWING

The invention is described in more detail with reference to the drawing, where:

FIG. 2 shows a freezer segment with mould cassette;

FIG. 3 shows details concerning multi-chamber profiles, and

DETAILED DESCRIPTION OF THE INVENTION

Figure 1:
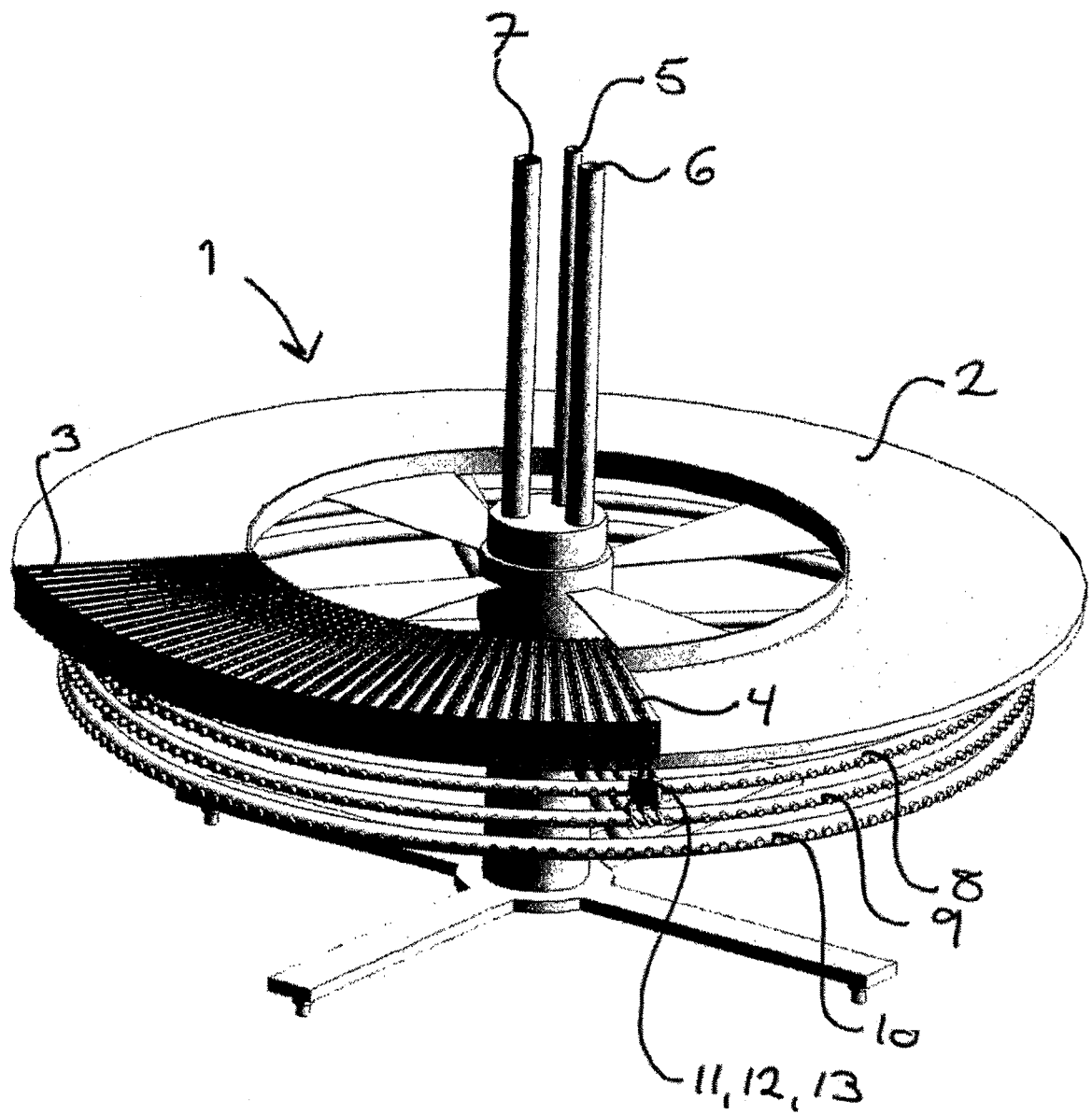
FIG. 1 shows schematically an annular freezer table according to the invention.

In FIG. 1 appears an incomplete annular freezer table 1 for a freezer which in principle may adapted to any existing system for filling moulds and for removing moulds. At the table 2 itself, a number of freezer segments 3 with individual moulds 4 are provided. At the centre of the annular freezer table is seen three pipes 5, 6, 7 that are to be connected to a not shown cooling system. The pipes 5, 6, 7 are each connected with the three pipe rings 8, 9, 10 which are disposed under the table 2 itself. The upper pipe ring 8 is intended for hot gas for stripping, the middle pipe ring 9 is intended for supplying fluid $CO_2$ for freezing ice, while the lowermost pipe ring 10 is intended for discharge of wet $CO_2$ gas. These pipe rings 8, 9, 10 are each connected to each single freezer segment 3 via controllable valves 11, 12, 13 (only one set of valves shown here).

In FIG. 2 appears a freezer segment 3 which is partly filled by two mould cassettes 14, each with six individual moulds 4. The freezer segment 3 is built up as a box with sides 15, ends 16 and with an invisible bottom 17, where the longitudinal sides 15 are constituted by multi-chamber profiles 18. When the freezer segment 3 is filled by mould cassette halves 14, a small interspace is formed between the mould cassette 14 and the internal side of the freezer segment 3. This interspace is filled with water which at the mounting of the mould cassette 14 is pressed up along it and possible excess water is pressed out of the interior of the freezer segment 3. In this way is achieved a good heat-conducting connection between the multi-chamber profiles 18 and the mould cassette 14.

Supply and discharge of coolant for cooling and for hot gas for stripping, e.g. fluid $CO_2$ or hot $CO_2$, occurs via a not shown manifold which is connected to all chambers 19 in the multi-chamber profile 18. Supply may e.g. be at the external diameter on an annular freezer table 1, whereas discharge may be at the internal diameter. Alternatively, supply and discharge may be effected at the same end of the freezer segment 3, as the gas is passed from one multi-chamber profile 18 to another 18 at the other end of the freezer segment 3. In principle, the connections may be disposed freely depending on various conditions.

FIG. 3 shows details from the end of a freezer segment 3 where the multi-chamber profiles 18 are seen, and where the individual chambers 19 in the profiles 18 are clearly seen.

Figure 4:
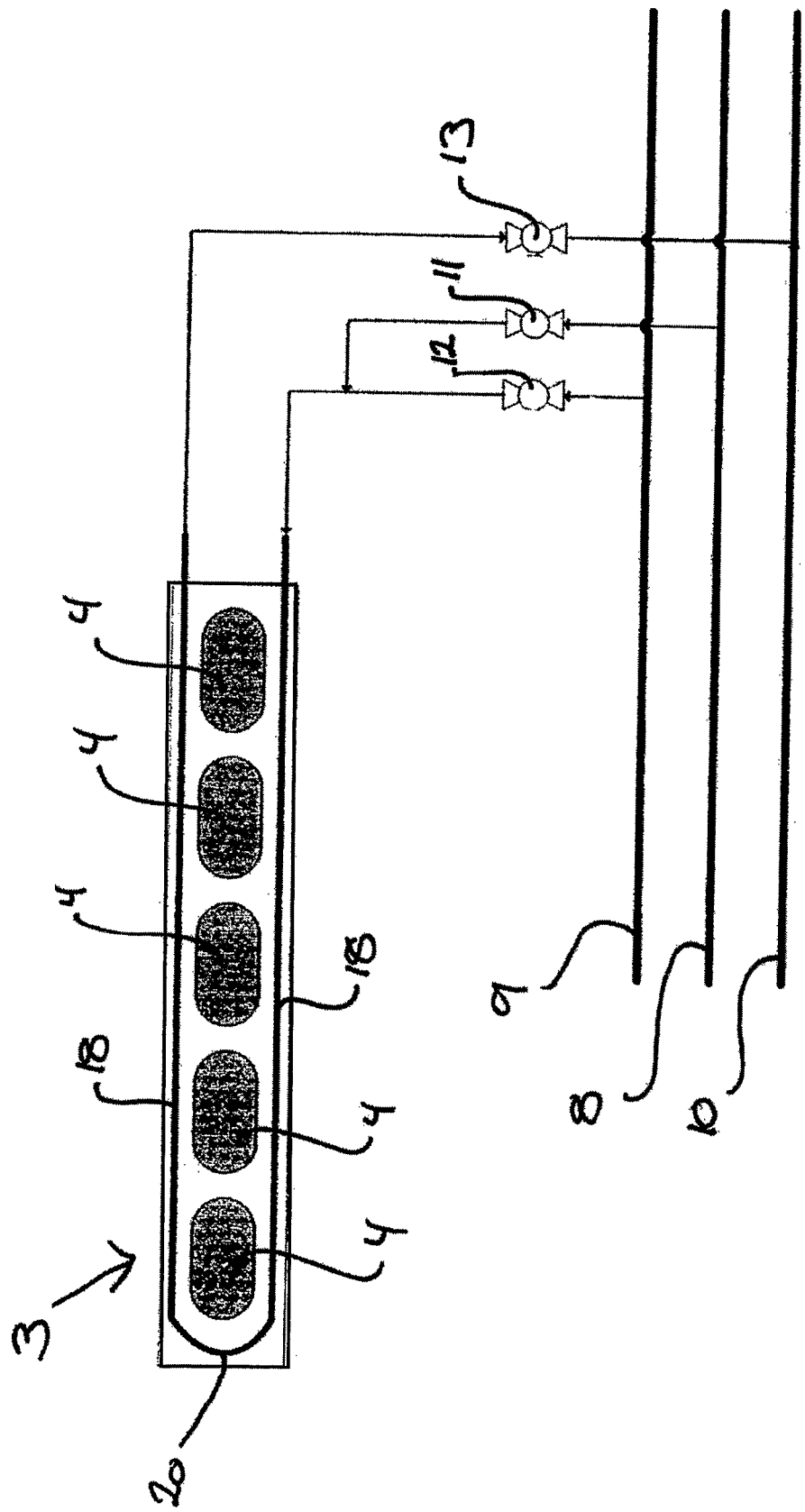
FIG. 4 shows schematically a pipe diagram for a freezer segment.

In FIG. 4 appears schematically a pipe diagram with a supply line 8 for hot gas for stripping, a supply line 9 for coolant and with a discharge line 10 for wet gas. Between all lines and the freezer segment 3, valves 11, 12, 13 that may be controlled individually are disposed. Coolant flows into the multi-chamber profiles 18 in the freezer segment and along the individual moulds 4. At the end of the freezer segment 3, coolant is conducted via a manifold 20 to another multi-chamber profile 18 and further back to the discharge line 10 for wet gas.

Figure 5:
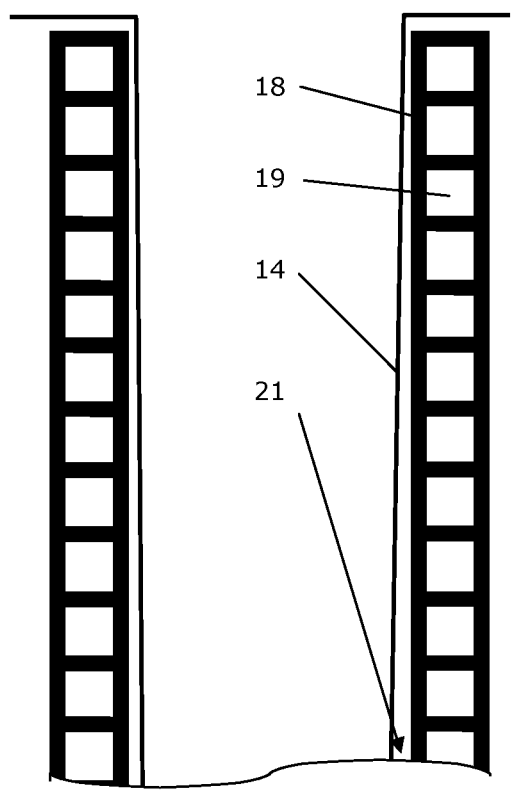
FIG. 5 shows a cross-sectional sketch of the upper part of the freezer segment.

FIG. 5 shows a cross sectional sketch of the upper part of the freezer segment with the multi-chamber profile 18 as illustrated in FIGS. 2 and 3 (not to scale) and which illustrates the gap 21 between the mould cassette 14 and the multi-chamber profile 18 with the channels/chambers 19. This gap 21 can be filled with a heat conducting material, for example water.

When cooling ice, the coolant is supplied, as mentioned, via the line 9 and the valve 12, and during passage of the multi-chamber profiles 18 to the valve 13 and the discharge line 10, the fluid $CO_2$ evaporates, whereby heat from the ice to the frozen is conducted away. After ending freezing, the valve 12 is closes and the supply of fluid coolant is terminated. In order that stripping may be effected, now hot gas is supplied via the line 8 and the valve 11, whereby the outermost layer of ice is melted and removal of the ice from the mould may occur.

The process of cooling a freezer segment with mould cassettes is a dynamic interaction between $CO_2$ and the evaporator wall which is here constituted by the multi-chamber profile 18 and by the mould cassette itself and by the ice. The liquid temperature will be retained at about −50° C., while the evaporator after removing the previous ice may be expected to be about +5° C. When the—compared to the evaporator wall—very cold $CO_2$ flows into the evaporator channels in the multi-chamber profiles, a very strong boiling will occur, causing rise in pressure. The liquid will thereby be pressed out of the evaporator again. When there is no more liquid on the "hot" evaporator surface, no further production of vapour will occur, and the pressure will drop again, after which liquid may run onwards in the channels again. Each time the evaporator surface will be cooled somewhat, and the liquid may penetrate further and further into the channels, finally running through the entire freezer segment.

Besides the requirement to rapid cooling of mould cassettes and thereby of ice, the temperature difference between inlet and outlet of the evaporator must not bee too great, as this will entail uneven cooling, particularly of the ice closest to the $CO_2$-connection. A typical temperature difference between inlet and outlet is about 1° C.

The invention claimed is:

1. A freezer segment for a freezer of the type to be used in making confectionery, including edible ice of ice-cream and so-called water ice or combinations thereof, where confectionery is cast in moulds which are cooled for freezing after filling and to which heat is applied after sufficient freezing or which is subjected to shock cooling for a short period so that removal from the mould may take place, wherein the freezer segment comprises at least one row of a plurality of individual moulds, and plate-shaped, extruded multi-chamber profiles with multiple individual channels containing $CO_2$ for transport of the $CO_2$ in one direction from one end of the extruded multi-chamber profiles to an opposite end of the extruded multi-chamber profiles and direct evaporation of the $CO_2$ and, wherein the multiple individual channels of at least one of the plate-shaped extruded multi-chamber profiles extend along the plurality of individual moulds for cooling of the plurality of individual moulds in the at least one row of individual moulds by heat conduction between the plurality of individual moulds in the at least one row of individual moulds and the $CO_2$ in the multiple individual channels, wherein the at least one row of the plurality of individual moulds forms a mould cassette that is arranged along at least one wall, wherein the wall is partially or entirely constituted by the extruded multi-chamber profile, and wherein a gap appears between the mould cassette and the extruded multi-chamber profiles.

2. Freezer segment according to claim 1, wherein the height of the plate-shaped multi-chamber profile in the freezer segment substantially corresponds to the depth of the mould.

3. Freezer segment according to claim 1, wherein the freezer segment is connected to a circuit with hot gas.

4. Freezer segment according to claim 1 wherein said individual moulds are built together in exchangeable mould cassettes, wherein at least one of the exchangeable mould cassettes is mounted in the freezer segment.

5. Freezer segment according to claim 4, wherein a mould cassette is arranged along at least one wall, where the wall is partially or entirely constituted by a plate-shaped multi-chamber profile, where a gap appears between the mould cassette and the multi-chamber profile.

6. A freezer segment according to claim 1, wherein the mould cassette is made up of at least two shell parts, where the at least two shell parts in a joined condition form at least one mould.

7. A freezer segment according to claim 6, wherein the mould cassette is configured for stripping including a step where the at least two shell parts are separated.

8. A freezer segment according to claim 1, wherein the mould cassette is mounted in the freezer segment and further comprising multiple mould cassettes mounted in multiple freezer segments mounted in either an the annular freezer table or in a longitudinal freezer table.

9. Freezer segment according to claim 3, wherein the hot gas is $CO_2$ or ammonia.

10. Freezer segment according to claim 5, wherein the gap is filled with a viscous material.

11. Freezer segment according to claim 5, wherein the gap is filled with water.

12. Freezer segment according to claim 1, wherein the freezer segment is built up as an elongated box with longitudinal sides, ends, and bottom, wherein the freezer segment is filled with at least two mould cassettes that fit exchangeably into the freezer segment, each mould cassette having a row of individual moulds, where the longitudinal sides of the freezer segment are constituted by the multi-chamber profiles.

13. A freezer segment according to claim 1, wherein the freezer segment further comprises one or more freezer segments, and wherein the mould cassette further comprises a plurality of adjoining individual moulds, which are mounted together in connection with one or of the more freezer segments.

* * * * *